(12) United States Patent
Kurupati

(10) Patent No.: US 7,236,497 B2
(45) Date of Patent: Jun. 26, 2007

(54) FACILITATING ARBITRATION VIA INFORMATION ASSOCIATED WITH GROUPS OF REQUESTERS

(75) Inventor: Sreenath Kurupati, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1164 days.

(21) Appl. No.: 10/229,852

(22) Filed: Aug. 28, 2002

(65) Prior Publication Data

US 2004/0042481 A1    Mar. 4, 2004

(51) Int. Cl.
*H04L 12/413*    (2006.01)
(52) U.S. Cl. ............... 370/447; 370/461; 370/462
(58) Field of Classification Search .............. None
See application file for complete search history.

(56) References Cited

U.S. PATENT DOCUMENTS

| | | | | |
|---|---|---|---|---|
| 5,463,624 A * | 10/1995 | Hogg et al. | ................ | 370/461 |
| 5,748,618 A * | 5/1998 | Rothrock | ................ | 370/260 |
| 5,796,741 A * | 8/1998 | Saito et al. | ................ | 370/439 |
| 6,487,213 B1 * | 11/2002 | Chao | ................ | 370/418 |
| 6,563,818 B1 * | 5/2003 | Sang et al. | ................ | 370/379 |
| 6,571,205 B1 * | 5/2003 | Doucet et al. | ................ | 703/24 |
| 2001/0038636 A1 * | 11/2001 | Nanduri et al. | ................ | 370/419 |
| 2002/0176431 A1 * | 11/2002 | Golla et al. | ................ | 370/412 |

\* cited by examiner

*Primary Examiner*—Chau Nguyen
*Assistant Examiner*—Jung Park
(74) *Attorney, Agent, or Firm*—Buckley, Maschoff & Talwalkar LLC

(57) ABSTRACT

According to some embodiments, a requester is selected in accordance with information associated with a first and second groups of requesters. For example, a first input may receive a first priority signal, indicating whether at least one of a first group of requesters is requesting to be selected, along with a first identifier that may indicate a particular one of the first group of requesters. Similarly, a second input may a second priority signal, indicating whether at least one of a second group of requesters is requesting to be selected, along with a second identifier that may indicate a particular one of the second group of requesters. An output might then provide the first identifier if the first priority signal indicates that at least one of the first group of requesters is requesting to be selected. The output might instead provide the second identifier if: (i) the first priority signal indicates that none of the first group of requesters is requesting to be selected, and (ii) the second priority signal indicates that at least one of the second group of requesters is requesting to be selected.

10 Claims, 7 Drawing Sheets

FACILITATING ARBITRATION VIA INFORMATION ASSOCIATED WITH GROUPS OF REQUESTERS

BACKGROUND

In some situations, a number of different units (e.g., hardware or software units) will share a limited resource. For example, a number of modules in a network device might provide packets that will be processed via a single pipeline. Moreover, two or more of these units might simultaneously need to access the resource. In order to determine which of the units will be able to access the resource, an arbitration unit can be provided.

For example, FIG. 1 is a block diagram of a known arbitration unit 100. The arbitration unit 100 receives information from a number of units that might request access to a limited resource (i.e., "requesters" 0 through N−1). The received information might indicate, for example, whether or not a particular requester currently needs to access the resource. Based on the received information, the arbitration unit 100 selects one of the requesters.

In a sequential priority encoding scheme, the arbitration unit 100 sequentially examines the information received from each requester and selects the first requester that needs to access a resource. Assume, for example, that the arbitration unit 100 receives information from ten requesters—and that only the third and seventh requesters currently need to access the resource. In this case, the arbitration unit 100 first evaluates information received from the first and second requesters (and does not select either of those requesters because neither needs to access the resource). The arbitration unit 100 then evaluates information received from the third requester—and provides an indication that the "selected requester" is the third requester. The third requester is then allowed to access the resource (e.g., a packet from that resource might be processed via a pipeline in a network device).

Consider an arbitration unit 100 that receives a bit r[0] from a first requester, where r[0] can equal "0" (indicating that the first requester is not currently seeking access to a resource) or "1" (indicating that the first requester is currently seeking access to the resource). Similarly, the arbitration unit 100 receives r[1], r[2], . . . r[N−1] from other requesters. In this case, the Selected_Requester (i.e., having a value from 0 through N−1) can be calculated as follows:

If (r[0]) Selected_Requester=0;
Else if (r[1]) Selected_Requester=1;
Else if (r[2]) Selected_Requester=2;
. . .
Else if (r[N−1]) Selected_Requester=N−1

There is a disadvantage, however, with calculating Selected_Requester in this traditional way. In particular, the calculation may take a significant amount of time, especially when there are a large number of requesters. For example, when N equals one hundred (i.e., there are one hundred requesters), the calculation might require up to 100 sequential logic gates. As a result, the selection of a requester might take more than one clock cycle to process.

DETAILED DESCRIPTION

Some embodiments described herein are associated with "network" devices. As used herein, the term "network" may refer to, for example, a number of interconnected hardware devices and associated software through which information packets may be exchanged. For example, information packets may be exchanged in accordance with the Fast Ethernet Local Area Network (LAN) transmission standard 802.3-2002® published by the Institute of Electrical and Electronics Engineers (IEEE). Examples of network devices include network switches and routers.

Arbitration System

Figure 1:
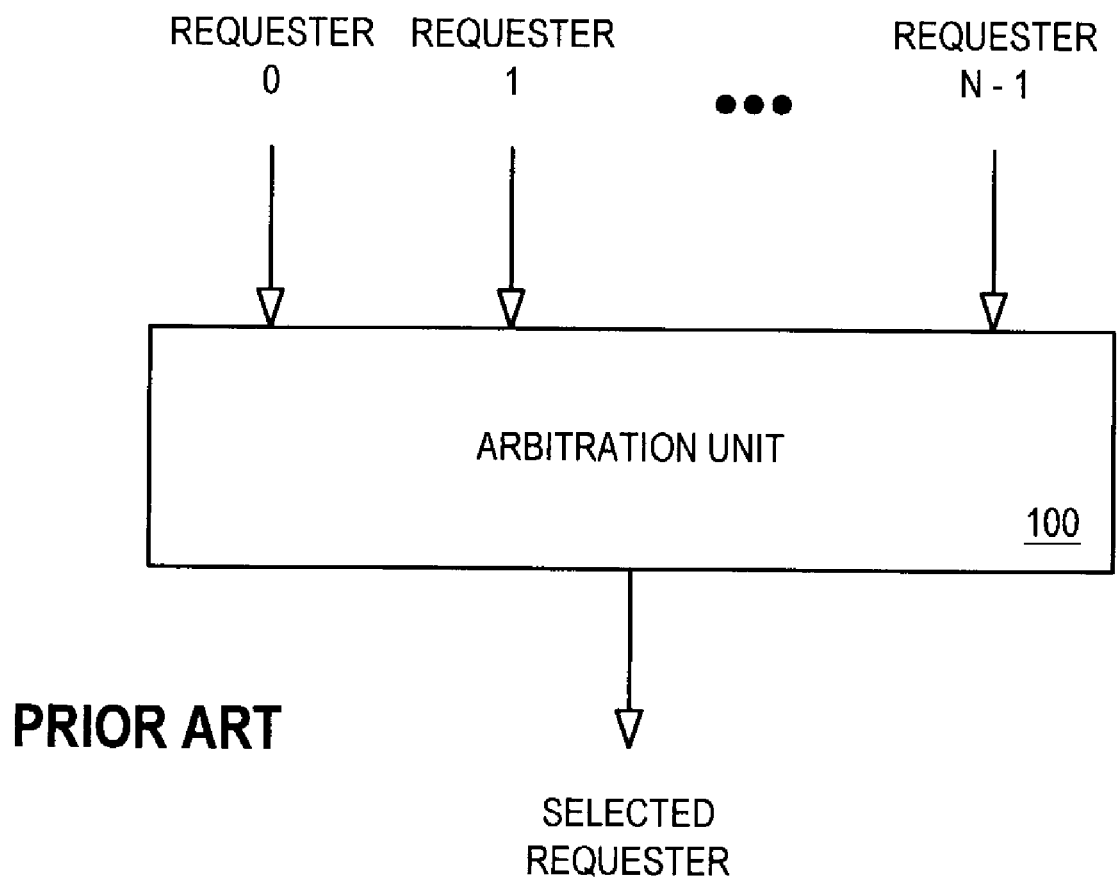
FIG. 1 is a block diagram of a known arbitration unit.
Figure 2:
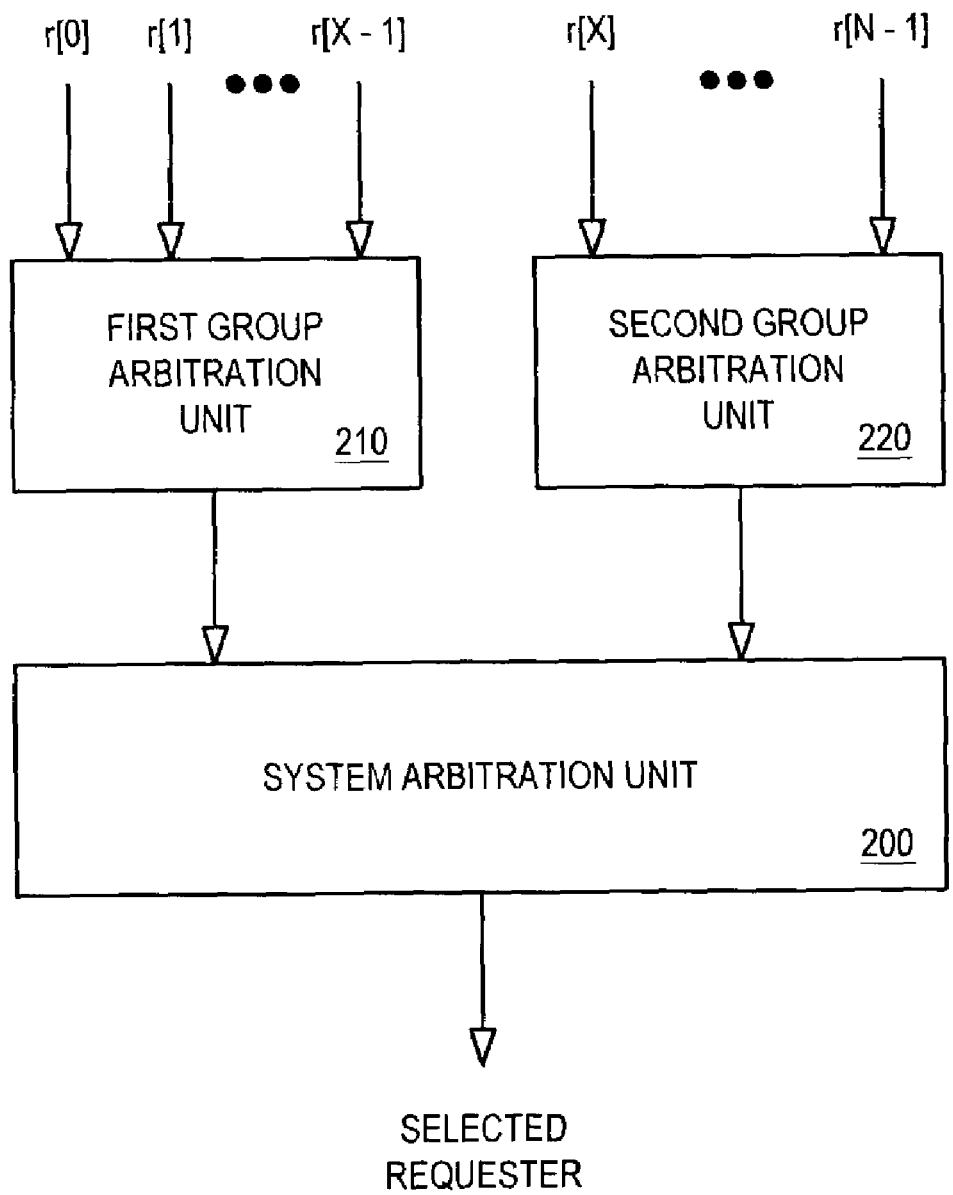
FIG. 2 is a block diagram of an arbitration system according to some embodiments.

FIG. 2 is a block diagram of an arbitration system according to some embodiments. The arbitration system may be used to select one of N requesters that might seek access to a shared resource. A first group arbitration unit 210 receives information from a first group of requesters. As used herein, the phrase "group of requesters" indicates that more than one requester is included in the group (i.e., the group includes at least two requesters). In particular, the first group of requesters illustrated in FIG. 2 includes a total of X requesters.

The information received from each requester may comprise, for example, a single bit (i.e., r[0] through r[X−1]), wherein "0" indicates that the requester is not currently seeking access to a resource and "1" indicates that the requester is seeking access. Similarly, a second group arbitration unit 220 receives information from a second group that includes a total of N-X requesters (i.e., r[X] through r[N−1]). Note that the two groups may, or may not, be of equal size. For example, one hundred requesters might be divided into two groups of fifty or into one group of twenty five and one group of seventy five.

A system arbitration unit 200 receives information from both the first and second group arbitration units 210, 220 and provides an indication associated with a selected requester (e.g., one of the requesters in the first or second groups). The indication may be, for example, an identifier associated with the selected requester. According to some embodiments, the indication is instead some other information associated with the selected requester (e.g., an information packet associated with the selected requester).

The system arbitration unit 200 may select the requester based on the information received from the first and second group arbitration units 210, 220. For example, according to one embodiment, the information received from the first group arbitration unit 210 includes both: (i) a first priority signal indicating whether at least one of the first group of requesters is asking to be selected (e.g., is seeking to access a shared resource), and (ii) a first identifier that might indicate a particular one of the first group of requesters (e.g., the first identifier may have a value from 0 through X−1).

Similar information may be received from the second group arbitration unit 220 (i.e., regarding the second group of requesters). Note that the second identifier may have a value from X through N−1.

In this case, the system arbitration unit 200 may select a requester based on the first identifier if the first priority signal indicates that at least one of the first group of requesters is asking to be selected. On the other hand, the system arbitration unit 200 may select a requester based on the second identifier if: (i) the first priority signal indicates that none of the first group of requesters is asking to be selected, and (ii) the second priority signal indicates that at least one of the second group of requesters is asking to be selected.

Because the first and second group arbitration units 210, 220 may simultaneously evaluate information from requesters, the time required to select a requester may be reduced. For example, when there are one hundred requesters (and first and second groups each include fifty requesters), the total calculation may only require up to fifty one sequential logic gates. That is, each of the first and second group arbitration units 210, 220 can simultaneously use fifty sequential logic gates and the system arbitration unit 200 can then use an additional logic gate to determine the selected requester.

Although the system illustrated in FIG. 2 includes two groups of requesters, additional groups can be included according to other embodiments. For example, one hundred requesters may be divided into five groups, each including twenty requesters (and five group arbitration units may be utilized). In this case, the number of sequential logic gates required may be further reduced to twenty five (e.g., twenty for each of the group arbitration units and five for the system arbitration unit).

Arbitration Method

Figure 3:
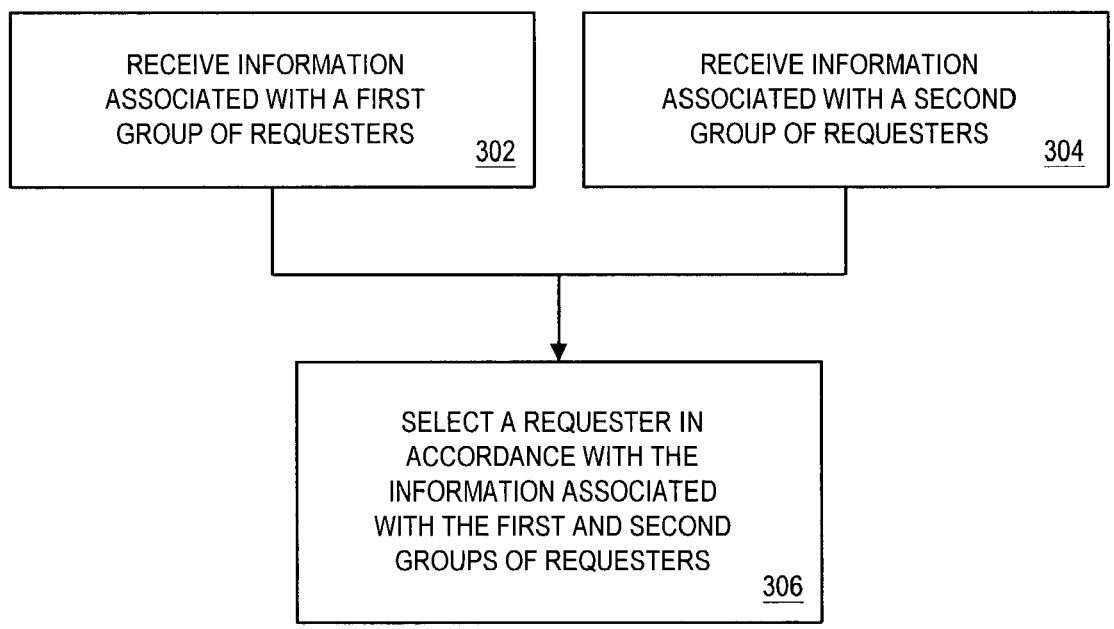
FIG. 3 is a flow chart of a method of facilitating arbitration according to some embodiments.

FIG. 3 is a flow chart of a method of facilitating arbitration according to some embodiments. The flow charts described herein do not imply a fixed order to the actions, and embodiments may be practiced in any order that is practicable. The method may be associated with, for example, the system arbitration unit 200 illustrated in FIG. 2.

At 302, information associated with a first group of requesters is received. The information may be received from, for example, the first group arbitration unit 210. The received information may include a first priority signal indicating whether at least one of the first group of requesters is asking to be selected (e.g., is seeking to access a shared resource). The received information may further include a first identifier associated with a particular one of the first group of requesters. At 304, similar information associated with a second group of requesters is received (e.g., including a second priority signal and a second identifier). Note that information associated with the first and second groups of requesters may (or may not) be received at the same time.

At 306, a requester is selected in accordance with the information associated with the first and second groups of requesters. For example, the system arbitration unit 200 may select the requester based on the first identifier if the first priority signal indicates that at least one of the first group of requesters is asking to be selected. On the other hand, the system arbitration unit 200 may select the requester based on the second identifier if: (i) the first priority signal indicates that none of the first group of requesters is asking to be selected, and (ii) the second priority signal indicates that at least one of the second group of requesters is asking to be selected.

Arbitration Example

Figure 4:
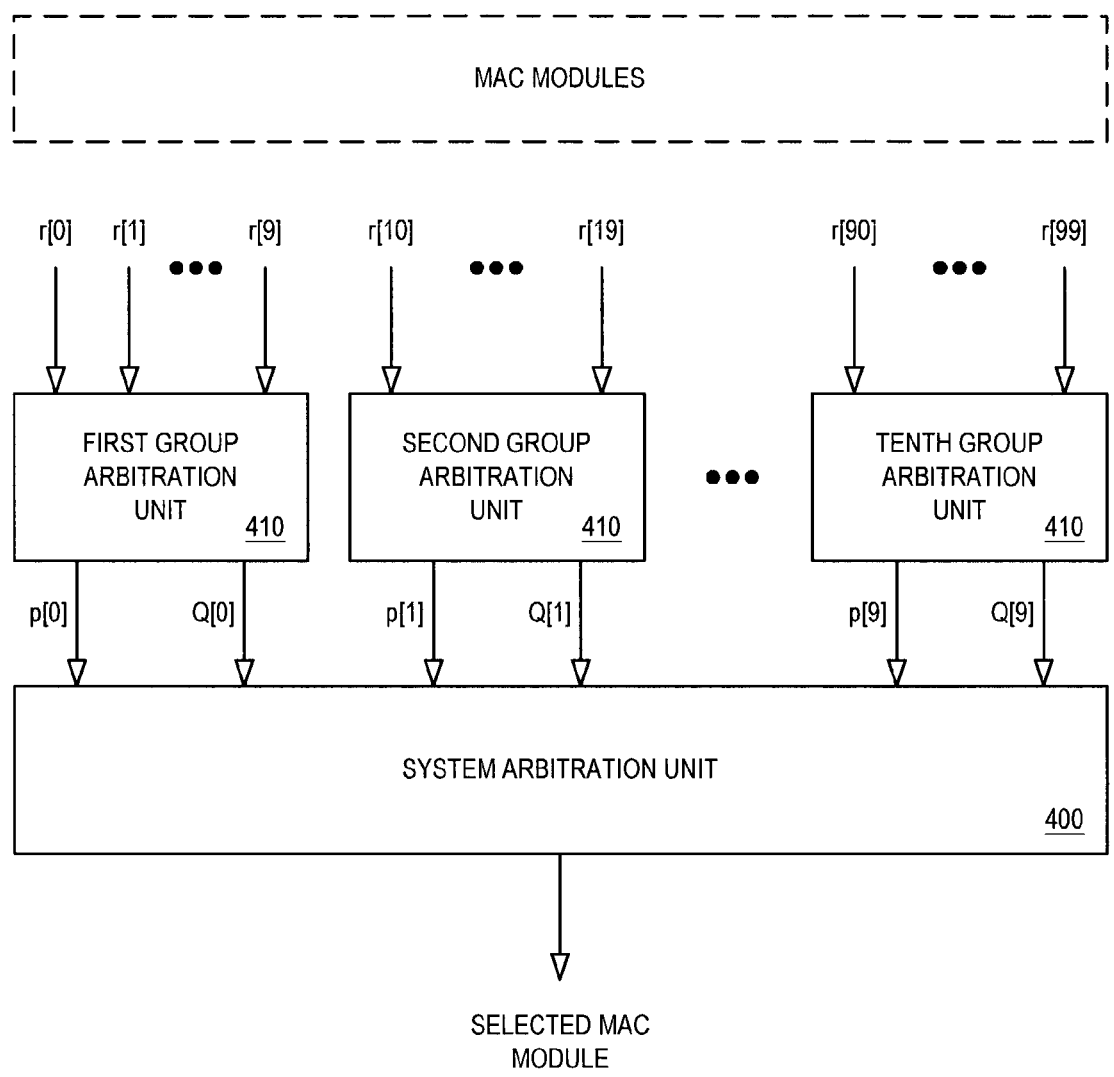
FIG. 4 is a block diagram of an arbitration system according to some embodiments.

FIG. 4 is a block diagram of an arbitration system that may be used to perform arbitration for one hundred requesters according to some embodiments. The system may be associated with, for example, a packet network, a Local Area Network (LAN), an Ethernet network, a switch, and/or a router. The requesters may comprise, for example, Media Application Control (MAC) modules that might seek to exchange information packets with external devices via a shared main pipeline.

The system includes a system arbitration unit 400 that receives information from ten group arbitration units 410. The system arbitration unit 400 and group arbitration units 410 may be provided, for example, in an Application Specific Integrated Circuit (ASIC) device. As other examples, the system arbitration unit 400 may be associated with a Field-Programmable Gate Array (FPGA) device or a custom integrated circuit.

Each of the ten group arbitration units 410 is associated with, and receives information from, ten MAC modules. For example, the first group arbitration unit 410 receives bits r[0] through r[9], where an r[ ] value can equal "0" (indicating that the MAC module does not have an information packet ready to be processed via the main pipeline) or "1" (indicating that the MAC module does have an information packet ready to be processed). Similarly, the second group arbitration unit 410 receives r[10] through r[19].

Each group arbitration unit 410 provides a priority signal to the system arbitration unit 400. For example, the first group arbitration unit 410 provides p[0], where p[0] can equal "0" (indicating that none of the ten MAC modules in the first group have an information packet that is ready to be processed via the main pipeline) or "1" (indicating that at least one of the ten MAC module in the first group does have an information packet ready to be processed).

Each group arbitration unit 410 also provides an identifier that may be associated with a particular MAC module in the associated group. For example, the first group arbitration unit 410 provides Q[0], where Q[0] can equal 0 through 9. Similarly, the second group arbitration unit 410 provides Q[1], where Q[1] can equal 10 through 19 (e.g., representing the ten MAC modules in the second group). The p[ ] and Q[ ] values may be associated with, for example, bookkeeping registers.

Figure 5:
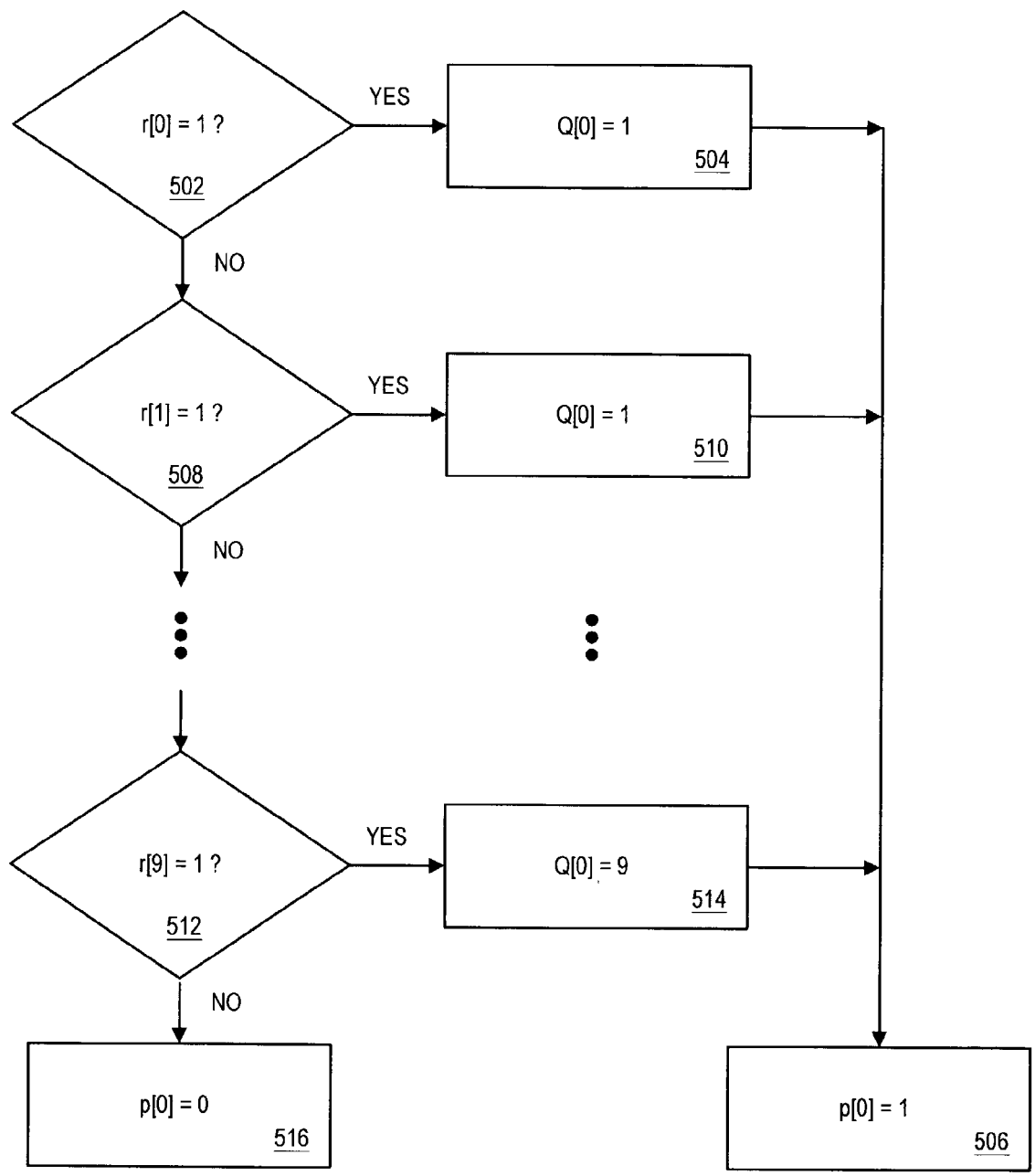
FIG. 5 is a flow chart of a method that may be performed by a group arbitration unit according to some embodiments.

FIG. 5 is a flow chart of a method that may be performed by the first group arbitration unit 410 according to some embodiments. At 502, the first group arbitration unit 410 determines if r[0] equals "1" (e.g., indicating that the associated MAC module has an information packet that is ready to be processed). If r[0] equals "1," the first group arbitration unit 410 sets Q[0] to "0" at 504 (e.g., representing that particular MAC module) and p[0] to "1" at 506 (e.g., indicating that at least one MAC module in the first group has an information packet ready to be processed).

If r[0] does not equal "1" (e.g., indicating that the associated MAC module does not have an information packet ready to be processed), the first group arbitration unit 410 moves on and determines if r[1] equals "1" at 508. If r[1] equals "1," the first group arbitration unit 410 sets Q[0] to "1" at 510 (e.g., representing that MAC module) and p[0] to "1" at 506 (e.g., again indicating that at least one MAC module in the first group has an information packet ready to be processed).

Similar evaluations are performed for each of the ten modules in the first group until r[9] is evaluated at 512 and, if appropriate, Q[0] is set to "9" at 514. If none of the ten MAC modules indicate that an information packet is ready for processing (i.e., r[0] through r[9] are all equal to "0"), p[0] is set to "0" at 516 (e.g., indicating that none of the ten MAC modules in the first group currently has an information packet that is ready to be processed). In this case, the value of Q[0] does not matter.

Similar methods may be performed by the other group arbitration units 410 to generate p[1] through p[9] and Q[1] through Q[9]. Note that the processing may be described as follows:

p[0]=0; p[1]=0; . . . p[9]=0
If (r[0]) {Q[0]=0; p[0]=1}; \\first group calculation
Else if (r[1]) {Q[0]=1; p[0]=1};
. . .
Else if (r[9]) {Q[0]=9; p[0]=1};
. . .
If (r[90]) {Q[9]=90; p[9]=1}; \\tenth group calculation
Else if (r[91]) {Q[9]=1; p[9]=1};
. . .
Else if (r[99]) {Q[9]=99; p[9]=1}

Note that the ten group calculations may be performed simultaneously (e.g., by ten different group arbitration units 410).

The system arbitration unit 400 may then use the information generated by the group arbitration units 410 (i.e., p[0] through p[9] and Q[0] through Q[9]) to select a MAC module from which an information packet will be received and processed via the main pipeline.

Figure 6:
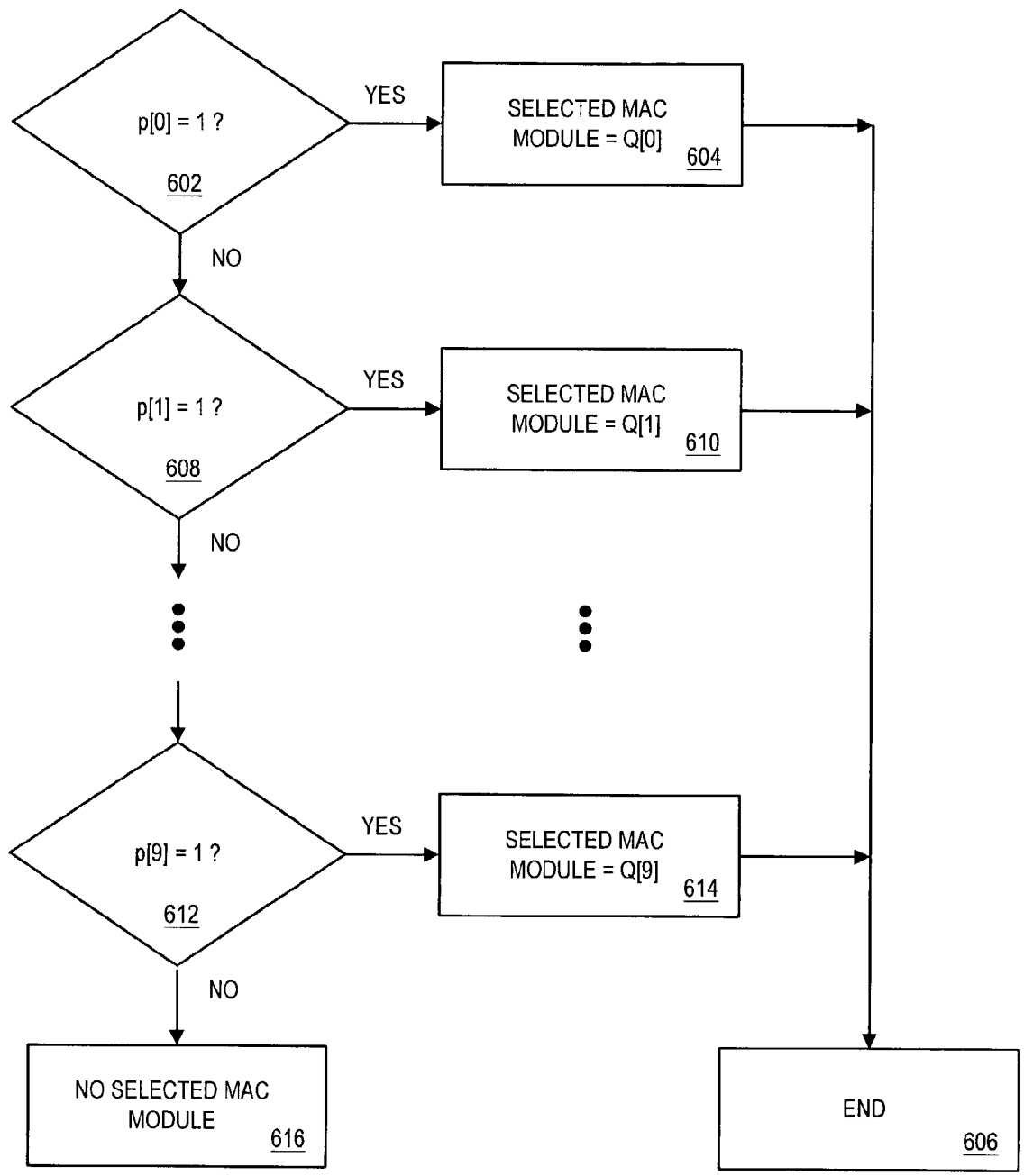
FIG. 6 is a flow chart of a method that may be performed by a system arbitration unit according to some embodiments.

FIG. 6 is a flow chart of a method that may be performed by the system arbitration unit 400 according to some embodiments. At 602, the system arbitration unit 400 determines if p[0] equals "1" (e.g., indicating that one of the ten MAC modules in the first group has an information packet ready to be processed). If p[0] equals "1," the system arbitration unit 400 sets the selected MAC module to Q[0] at 604 and the process ends at 606.

If p[0] equals "0" (e.g., indicating that none of the ten MAC modules in the first group has an information packet), the system arbitration unit 400 moves on and determines if p[1] equals "1" at 608. If p[1] equals "1," the system arbitration unit 400 sets the selected MAC module to Q[1].

Similar evaluations are performed for each of the ten group arbitration units 410 until p[9] is evaluated at 612 and, if appropriate, the selected MAC module is set to Q[9] at 614. If none of the ten group arbitration units 410 indicate that at least one MAC module in its associated group has an information packet ready for processing (i.e., p[0] through p[9] are all equal to "0"), no MAC module is selected at 716. If, on the other hand, a MAC module is selected by the system arbitration unit 400, the information packet from that MAC module may then be processed (e.g., via the main pipeline).

Consider the case when the fourteenth, seventeenth, and ninety fifth MAC modules have information packets ready to be processed via the main pipeline. In this case, r[14], r[17], and r[95] will equal "1" (and all of the other r[ ] values will equal "0"). Of course, in other embodiments other values may be used instead (e.g., a "1" might indicate that a requester is not seeking to use a resource).

In accordance with the present example, p[1] and p[9] will equal "1" (and all of other p[ ] values will equal "0"). In addition, Q[1] will equal "14" and Q[9] will equal "95." According to other embodiments, the Q[ ] values may instead represent an offset (e.g., Q[1] could equal "4" and Q[9] could equal "5").

As result of these p[ ] and Q[ ] values, the system arbitration unit 400 selects and processes an information packet from the fourteen MAC module. Note that the processing may be described as follows:

If (p[0]) selected_MAC_module=Q[0]; \\system calculation
Else if (p[1]) selected_MAC_module=Q[1];
. . .
Else if (p[9]) selected_MAC_module=Q[9]

Because the ten group calculations may be performed simultaneously (e.g., by ten different group arbitration units 410), the number of sequential logic gates required to perform sequential priority encoding arbitration may be reduced. Thus, the arbitration may require less time (e.g., processing clock cycles) to perform.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

In some of the embodiments described herein, an arbitration unit provides an output that indicates a selected requester (e.g., an identifier). According to other embodiments, however, an arbitration unit may instead provide other information associated with a selected requester. For example, the arbitration unit may provide an information packet associated with the selected requester.

In addition, some embodiments are directed to networks (e.g., packet networks, LANs and/or Ethernet networks) and network devices (e.g., switches and/or routers). Note, however, that embodiments may also be directed to other types of arbitration associated with a resource (e.g., outside of a network context).

Similarly, in some embodiments an arbitration unit selects a single requester. According to other embodiments, however, the arbitration unit may instead select two or more requestors (e.g., a resource might be able to handle two requesters at the same time). In addition, the particular information described herein is for illustration purposes only. For example, the priority signal p[ ] and the identifier Q[ ] could be combined into a single value (e.g., a value from 0 through 10, where 0 indicates that no requester is seeking to access a limited resource).

Figure 7:
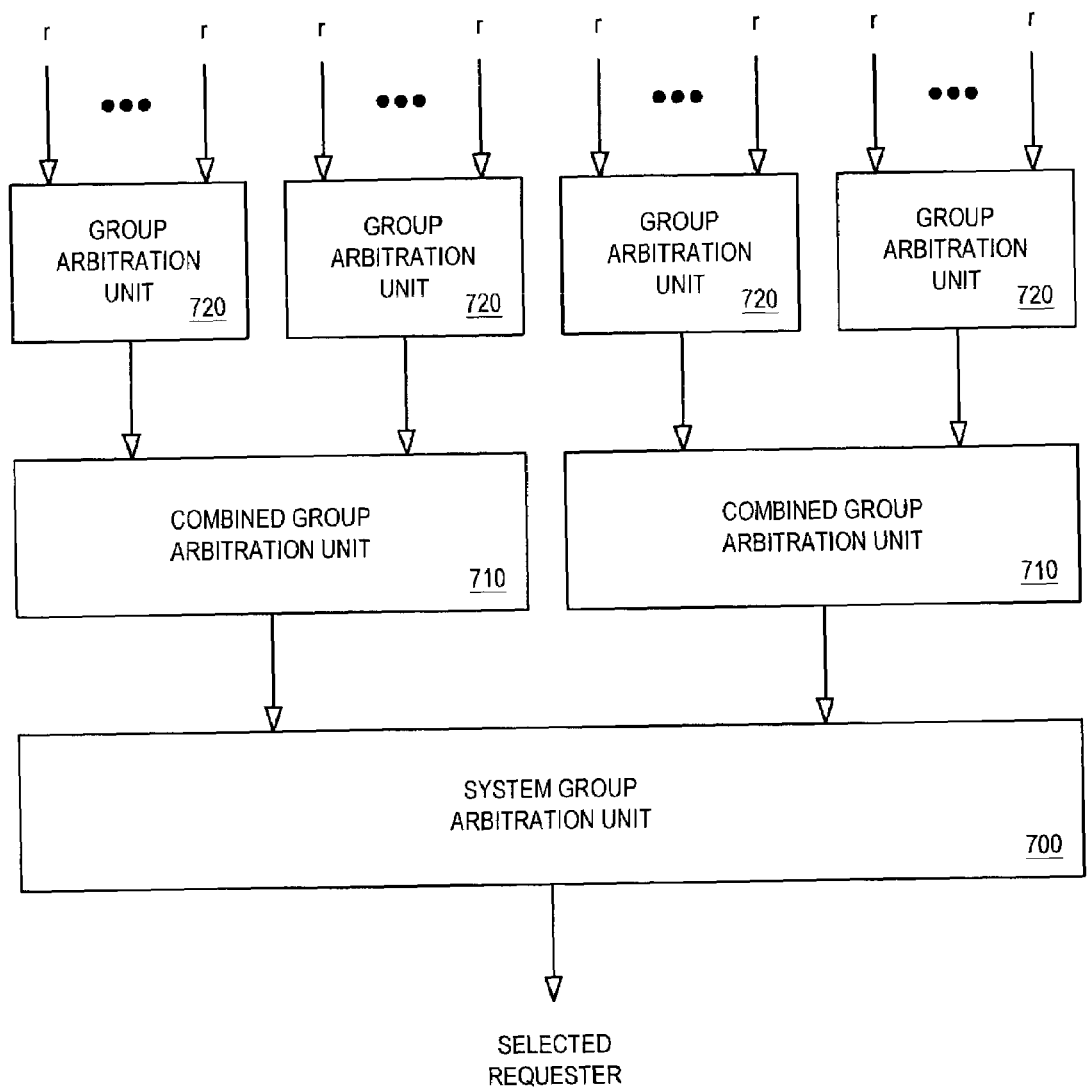
FIG. 7 is a block diagram of an arbitration system according to some embodiments.

Moreover, an arbitration system may be provided using more than two levels (e.g., more than a first level that includes a number of group arbitration units and a second level that includes a system arbitration unit). For example, FIG. 7 is a block diagram of an arbitration system according to some embodiments. In this case, a number of group arbitration units 720 receive information from groups of requesters (e.g., indicating whether or not the requesters need to access a resource). Moreover, combined group arbitration units 710 receive information from the group arbitration units 720 (e.g., indicating whether at least one requester in the associated group needs to access the resource). Finally, a system group arbitration unit 700 receives information from the combined group arbitration units 710 (e.g., indicating whether at least one requester from any of the associated groups is asking to access the resource) and provides a selected requestor.

Moreover, although software or hardware are described as performing certain functions, such functions may be performed using software, hardware, or a combination of software and hardware (e.g., a medium may store instructions adapted to be executed by a processor to perform a method of facilitating arbitration). For example, functions described herein may be implemented via a software simulation of ASIC hardware.

The several embodiments described herein are solely for the purpose of illustration. Persons skilled in the art will recognize from this description other embodiments may be practiced with modifications and alterations limited only by the claims.

What is claimed is:

1. An apparatus, comprising:
    a first input to receive:
        a first priority signal indicating whether at least one of a first group of requesters is requesting to be selected, and
        a first identifier that may indicate a particular one of the first group of requesters; a second input to receive:
        a second priority signal indicating whether at least one of a second group of requesters is requesting to be selected, and
        a second identifier that may indicate a particular one of the second group of requesters; and
    an output to provide:
        the first identifier if the first priority signal indicates that at least one of the first group of requesters is requesting to be selected, and
        the second identifier if: (i) the first priority signal indicates that none of the first group of requesters is requesting to be selected, and (ii) the second priority signal indicates that at least one of the second group of requesters is requesting to be selected.

2. The apparatus of claim 1, further comprising:
    additional inputs, each additional input being associated with an additional group of requesters.

3. The apparatus of claim 1, wherein the first and second groups of requesters comprise a first combined group of requesters, and the output is to be provided to a system arbitration unit that also receives another output associated with a second combined group of requesters.

4. The apparatus of claim 1, wherein the apparatus is associated with at least one of: (i) a packet network, (ii) a local area network, (iii) an Ethernet network, (iv) a switch, or (v) a router.

5. The apparatus of claim 4, wherein each requester is associated with a media application control module.

6. The apparatus of claim 1, wherein the selected requester is associated with an information packet to be processed.

7. The apparatus of claim 1, wherein the apparatus is associated with at least one of: (i) an application specific integrated circuit device, (ii) a field-programmable gate array device, or (iii) a custom integrated circuit.

8. A method of facilitating arbitration among a plurality of requesters, comprising:
    receiving from a first group arbitration unit a first requester identifier associated with a first group of requesters;
    receiving from a second group arbitration unit a second requester identifier associated with a second group of requesters;
    selecting a particular one of the first or second requester identifiers, wherein said selecting is further based on a first priority signal indicating whether at least one of the first group of requesters is requesting to be selected, and a second priority signal indicating whether at least one of the second group of requesters is requesting to be selected; and
    servicing a requester associated with the selected requester identifier, wherein the selected requested identifier is associated with:
        the first identifier if the first priority signal indicates that at least one of the first group of requesters is requesting to be selected, and
        the second identifier if: (i) the first priority signal indicates that none of the first group of requesters is requesting to be selected, and (ii) the second priority signal indicates that at least one of the second group of requesters is requesting to be selected.

9. A medium storing instructions adapted to be executed by a processor to perform a method of facilitating arbitration among a plurality of requesters, comprising:
    receiving from a first group arbitration unit a first requester identifier associated with a first group of requesters;
    receiving from a second group arbitration unit a second requester identifier associated with a second group of requesters;
    selecting a particular one of the first or second requester identifiers, wherein said selecting is further based on a first priority signal indicating whether at least one of the first group of requesters is requesting to be selected, and a second priority signal indicating whether at least one of the second group of requesters is requesting to be selected; and
    servicing a requester associated with the selected requester identifier, wherein the selected requested identifier is associated with:
        the first identifier if the first priority signal indicates that at least one of the first group of requesters is requesting to be selected, and
        the second identifier if: (i) the first priority signal indicates that none of the first group of requesters is requesting to be selected, and (ii) the second priority signal indicates that at least one of the second group of requesters is requesting to be selected.

10. The medium of claim 9, wherein said servicing is associated with information packets and the information packets are associated with an Ethernet network.

* * * * *